(12) United States Patent
Vija et al.

(10) Patent No.: US 11,774,608 B2
(45) Date of Patent: Oct. 3, 2023

(54) SENSOR LAYOUT FOR DIRECT CONVERTER DETECTOR

(71) Applicant: Siemens Medical Solutions USA, Inc., Malvern, PA (US)

(72) Inventors: Alexander Hans Vija, Evanston, IL (US); Miesher Rodrigues, Buffalo Grove, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 71 days.

(21) Appl. No.: 17/596,602

(22) PCT Filed: Apr. 13, 2020

(86) PCT No.: PCT/US2020/027901
§ 371 (c)(1),
(2) Date: Dec. 14, 2021

(87) PCT Pub. No.: WO2021/071549
PCT Pub. Date: Apr. 15, 2021

(65) Prior Publication Data
US 2022/0342091 A1    Oct. 27, 2022

Related U.S. Application Data

(60) Provisional application No. 62/912,875, filed on Oct. 9, 2019.

(51) Int. Cl.
*G01T 1/24* (2006.01)

(52) U.S. Cl.
CPC ...................................... *G01T 1/24* (2013.01)

(58) Field of Classification Search
CPC ........................................................ G01T 1/24
See application file for complete search history.

(56) References Cited

U.S. PATENT DOCUMENTS

| 3,937,964 | A | * | 2/1976 | Muehllehner | G01T 1/1642 |
| | | | | | 250/369 |
| 6,169,287 | B1 | | 1/2001 | Warburton | |
| 6,194,726 | B1 | * | 2/2001 | Pi | G01T 1/161 |
| | | | | | 250/363.02 |
| 2003/0111610 | A1 | | 6/2003 | Wagenaar et al. | |

(Continued)

FOREIGN PATENT DOCUMENTS

WO    2018229470 A1    12/2018

OTHER PUBLICATIONS

International Search Report for corresponding application No. PCT/US2020/027901, dated Jul. 31, 2020.

(Continued)

*Primary Examiner* — Hugh Maupin

(57) ABSTRACT

A system and method include an array of sensors electrically coupled to a material capable of converting a gamma ray to electrical charge, where distances between a center of a first sensor and centers of each sensor immediately-adjacent to the first sensor are substantially equal. Signals are collected from each sensor immediately-adjacent to the first sensor, and one of a plurality of logical sub-pixels of the first sensor is determined based on the signals collected from each sensor immediately-adjacent to the first sensor.

16 Claims, 7 Drawing Sheets

(56) References Cited

U.S. PATENT DOCUMENTS

| | | | |
|---|---|---|---|
| 2010/0252744 A1* | 10/2010 | Herrmann | G01T 1/241 |
| | | | 250/370.14 |
| 2011/0204245 A1* | 8/2011 | Robert | G01T 1/1647 |
| | | | 250/371 |
| 2012/0313196 A1* | 12/2012 | Li | H01L 31/03529 |
| | | | 257/E31.124 |
| 2018/0228451 A1* | 8/2018 | Li | A61B 6/40 |
| 2021/0382188 A1* | 12/2021 | Steadman Booker | G01T 1/17 |

OTHER PUBLICATIONS

Fiorini, C., et al. "Imaging performances of the DRAGO gamma camera." Nuclear Instruments and Methods in Physics Research Section A: Accelerators, Spectrometers, Detectors and Associated Equipment 604.1-2 (2009): 101-103.

Anger Hal O. et al:"Scintillation Camera, Review of Scientific Instruments", Jan. 1958, vol. 29, No. 1, pp. 27-33.

\* cited by examiner $$X_i = K_x \frac{(A_1 + A_2)}{(A_4 + A_5)} \qquad Y_i = K_y \frac{(A_1 + A_6)}{(A_3 + A_4)} \qquad Z_i = K_z \frac{(A_5 + A_6)}{(A_2 + A_3)}$$

$$Depth_i = K_{depth} \frac{Cathode}{Anode}$$

$$X_i = K_x \frac{(A_1 + A_2 + A_3)}{(A_4 + A_5 + A_6)} \qquad Y_i = K_y \frac{(A_1 + A_2 + A_6)}{(A_3 + A_4 + A_5)} \qquad Z_i = K_z \frac{(A_1 + A_5 + A_6)}{(A_2 + A_3 + A_4)}$$

$$Depth_i = K_{depth} \frac{Cathode}{Anode}$$

SENSOR LAYOUT FOR DIRECT CONVERTER DETECTOR

CROSS-REFERENCE TO RELATED PATENT APPLICATIONS

The present application claims priority to U.S. Provisional Patent Application No. 62/912,875, filed Oct. 9, 2019, the contents of which are incorporated herein by reference for all purposes.

BACKGROUND

A direct converter gamma ray detector uses a material such as Cadmium-Zinc-Telluride (CZT) to directly convert received gamma rays to electrical charge. Typically, anodes bonded to the surface of the conversion material define detector pixels. The anodes collect the electrical charge, which is then used to locate impinging gamma rays with respect to the defined pixels.

Typical detector designs use a lattice of square anodes to define the detector pixels. In order to increase the intrinsic resolution of such systems, algorithms such as Anger logic are implemented to locate gamma rays at sub-pixel positions. However, conventional anode lattices exhibit sub-optimal noise characteristics which directly limit the intrinsic resolution of the detector. Gamma ray location at sub-pixel positions is also sub-optimal due to a lack of isotropicity in the anode plane. For example, the uncertainty of sub-pixel positioning at the edges of a collecting anode is smaller than the uncertainty at the center.

Systems are desired to reduce noise and/or the non-uniformity of uncertainty over sensor area in a direct converter detector.

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments employ direct converter detector sensors exhibiting lower capacitance and greater signal-to-noise ratio than conventional sensors. Such capacitance may be achieved in some embodiments by reducing the sensor perimeter for a given sensor area. The lower capacitance and greater signal-to-noise ratio leads to reduced sub-pixel positioning uncertainty and improved intrinsic resolution.

Moreover, some embodiments employ a direct converter detector sensor array exhibiting more homogeneous electric field distributions and more uniform noise patterns and response over sensor sub-pixels than conventional sensor arrays. The homogeneity and uniformity result in more uniform sub-pixel positioning than previously available.

According to some embodiments, the distance between centers of adjacent sensors in the sensor array is substantially uniform. Such an arrangement may provide more homogeneous electric field distributions and more uniform noise patterns and response in comparison to a square lattice of sensors, in which the distance from the center of a sensor to the center of a neighboring (e.g., N, S, E, W) sensor is not equal to the distance from the center of the sensor to the center of another neighboring (e.g., NE, NE, SE, SW) sensor.

A sensor array according to some embodiments may consist of hexagonal-shaped sensors. Such a sensor array may further improve intrinsic resolution with respect to conventional systems by allowing calculation of sub-pixel position in three directions (e.g., a hexagonal grid pattern).

The reduction in non-linearity may reduce a need for position-dependent positioning corrections. Moreover, since the two-dimensional position of the septa of a detector collimator can be more accurately resolved than in prior systems (e.g., having square or rectangular-patterned sensors), embodiments may reduce the need to register the septa with the physical sensor boundaries.

Figure 1:
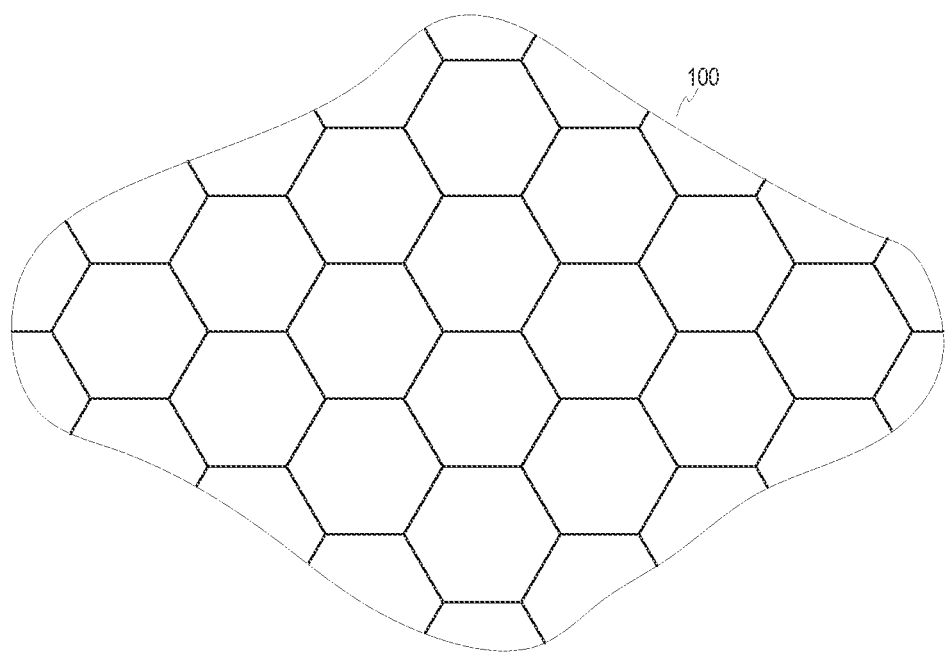
FIG. 1 is a view of a direct converter detector sensor array according to some embodiments.

FIG. 1 is a view of a portion of array 100 of individual hexagonal-shaped sensors according to some embodiments. A sensor as described herein may also be referred to as an anode, a pixel or an electrode in the art. Each of the hexagonal-shaped sensors is coupled to a dedicated signal line and is not in direct electrical contact with its adjacent neighboring sensors. Embodiments are not limited to the packing arrangement of array 100 or to the illustrated sensor shape.

The sensors of array 100 may exhibit lower capacitance and greater signal-to-noise ratio than conventional sensors. For example, a sensor of array 100 may exhibit lower capacitance and greater signal-to-noise ratio than a conventional square sensor having the same surface area, due to the lower perimeter-to-area ratio of a hexagon. As will be described below, the lower capacitance and greater signal-to-noise ratio may lead to reduced sub-pixel positioning uncertainty and improved intrinsic resolution.

Capacitance C between two parallel plates having area A separated by a distance d can be calculated $C=\varepsilon A/d$ if the distance d between the two parallel plates is sufficiently small with respect to the dimension of A, where C is the capacitance in farads, A is the area of overlap of the two plates in square meters, $\varepsilon$ is the electric constant of the material, and d is the separation between the plates in meters. Considering an arbitrary detection area of 4 $mm^2$ per sensor and an arbitrary sensor thickness of 5 mm, the capacitance of a hexagonal sensor is 4-5% smaller than the capacitance of a square sensor, or 1.479 pF for a square sensor and 1.415 pF for a hexagonal sensor. Accordingly, the hexagonal-shape sensor exhibits greater signal-to-noise and more uniform sub-pixel positioning uncertainty across the entire anode as compared with the square-shape sensor.

The largest contribution to the capacitance seen by a single sensor comes from the proximity of neighbor sensors, which relates to the perimeter of the pixels. Thus, triangular-, square- and hexagonal-shape sensors show decreasing capacitances for the same sensor area primarily due to the decreasing perimeter per unit area for each shape. A square-shape sensor has 88% of the perimeter of a triangular-shape sensor, while a hexagonal-shape sensor has 82% of the perimeter of a triangular-shape sensor. A hexagonal-shape sensor may therefore exhibit a signal-to-noise advantage over both square- and triangular-shape sensors in ultra-low noise systems which increases the intrinsic resolution of the systems.

The distance between centers of adjacent sensors of array 100 is substantially equal. Put differently, each sensor of array 100 is substantially equidistant from each sensor located immediately-adjacent thereto. As will be described below, such an arrangement may provide more homogeneous electric field distributions and more uniform noise patterns and response in comparison to a square lattice of sensors. The hexagonal packing of array 100 may also improve intrinsic resolution with respect to conventional systems by allowing calculation of sub-pixel position in three directions (e.g., a hexagonal grid pattern), as will be described below.

Figure 2:
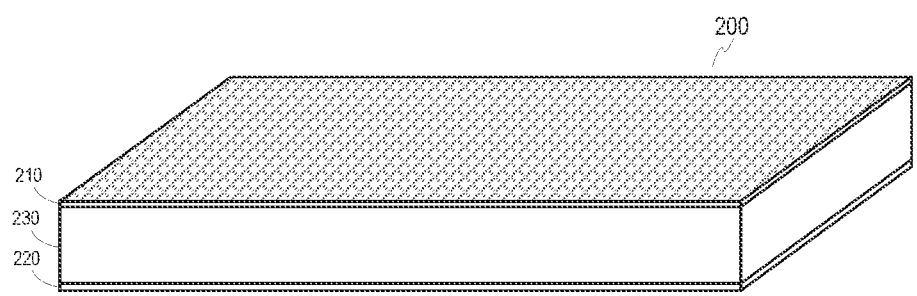
FIG. 2 is a view of components of a direct converter detector according to some embodiments.

FIG. 2 is schematic depiction of components of a direct converter detector according to some embodiments. Detector 200 includes sensor array 210, cathode 220, and direct conversion material 230 therebetween. Sensor array 210 may comprise an array grid of hexagonal or otherwise-shaped anodes as described herein. Cathode 220 may comprise a continuous layer which is generally transparent to gamma rays of energies that are to be detected by detector 200. Direct conversion material 230 may be composed of a single-crystal semiconductor material, such as CZT or Cadmium Telluride (CdTe).

Figure 3:
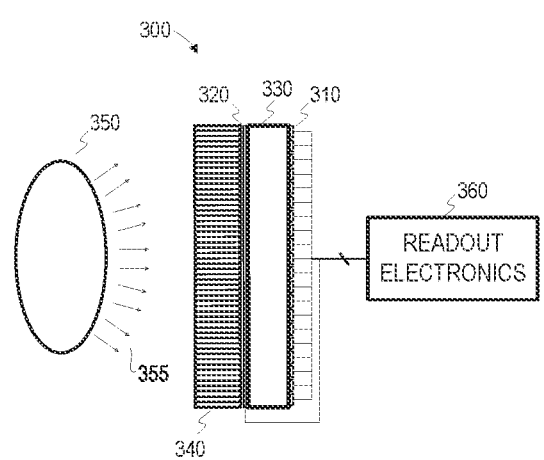
FIG. 3 illustrates operation of a direct converter detector according to some embodiments.

FIG. 3 illustrates detector 300 in one example of operation. Detector 300 may implement the structure of detector 200, including sensor array 310, cathode 320 direct conversion material 330 and as described above. Also shown is collimator 340 adjacent to cathode 320. Collimator 340 may comprise a multi-focal cone-beam collimator or parallel-hole collimator as is known in the art.

Detector 300 is positioned to detect gamma rays 355 emitted from volume 350. Systems for facilitating the emission of gamma rays from a volume are known in the art, and in particular with respect to single-photon emission computed tomography (SPECT) imaging. Certain ones of gamma rays 355 are collimated by collimator 340 to define their line-of-response and to filter out scattered or stray gamma radiation, and the thus-collimated gamma rays pass through cathode 320 due to its transparency thereto.

A gamma ray penetrates into direct conversion material 330 and interacts with direct conversion material 330 to generate electron-hole pairs. Cathode 320 is held at a negative bias potential while the sensors of array 310 are held at a less-repelling potential. Consequently, the positively-charged holes drift towards cathode 320, while the negatively-charged electrons drift towards the sensors of array 310. As the electrons approach a given sensor of array 310, a signal is induced at the given sensor and at its neighboring sensors.

After collection of the electrons by the given sensor, readout electronics 360 may use the signals received from the neighboring sensors to determine a sub-pixel position of the given sensor at which the gamma ray will be assumed to have been received. The sub-pixel positions at which all gamma rays are received may then be used to generate an image as is known in the art. Multiple such images may be acquired from different angles around volume 350 and used to reconstruct a three-dimensional image of volume 350, as is also known in the art.

Embodiments are not limited to the structure of FIGS. 2 and 3 or to the orientation of FIG. 3. For example, gamma rays may enter material 330 from any direction but the orientation of FIG. 3 may be beneficial due to the location of readout electronics 360 immediately adjacent to sensor array 310.

As mentioned above, the capacitance of a sensor according to some embodiments may be less than the capacitance of another sensor having the same surface area. Reduction of the capacitance seen by readout electronics 360 reduces the noise, and increases the signal-to-noise ratio, of the system.

Figure 4:
FIG. 4 is a flow diagram of a process to generate an image using a direct converter detector according to some embodiments.

FIG. 4 is a flow diagram of a process according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a CD, a DVD, a Flash drive, or a magnetic tape. Embodiments are not limited to the examples described below.

Initially, at S410, electrical charge is received at a first sensor of a direct converter gamma ray detector. As described above, the electrical charge may consist of electrons of electron-hole pairs generated by a direct converting material in response to penetration of a gamma ray. According to the present example, a center of each sensor which is directly adjacent to the first sensor is substantially equidistant to the center of the first sensor. This physical property is demonstrated by sensor array 100 of FIG. 1, but embodiments are not limited thereto.

Next, at S420, a sub-pixel of the sensor is determined based on electrical signals which are induced at each of the sensors directly adjacent to the first sensor and which correspond to the electrical charge received at the first sensor (i.e., which result from the same gamma ray interaction). As is known in the art, the induced signals on a sensor which collects generated electrons are different than signals induced on adjacent non-collecting sensors. The signals induced on the adjacent non-collecting sensors may therefore be used to determine a sub-pixel, or sub-region, of the collecting sensor where the gamma-ray interaction will be deemed to have occurred. In this regard, each sensor may be considered to define a number of logical sub-pixels.

S420 may proceed using Anger logic as is known in the art, however using a hexagonal grid rather than a cartesian grid. Anger logic involves the calculation of the ratio between the sum of signals on opposite sensors. However, in square-shape sensors, the contribution to the overall noise is not uniform for all sensors. Specifically, sensors that are closer to the collecting sensor, i.e., the N, S, E and W sensors, contribute more to the noise, while the other neighbor sensors, i.e., the NE, NW, SE and SW sensors, are further away from the collecting sensor and contribute less to the overall noise.

The resulting non-linearity of the calculated ratios causes greater uncertainty for events closer to the center of the sensor, where the ratios are almost flat and noise dominates the intrinsic resolution, particularly if the signal-to-noise ratio is small. Since the calculated ratios are highly non-linear, sub-pixel determination using conventional sensor arrays requires non-linear corrections to calculate the estimated true interaction position. Moreover, using square-shape sensors, the ratios are typically calculated in two orthogonal directions, e.g., X-Y directions, which are defined by the sensors near the collecting sensor.

Figure 5:
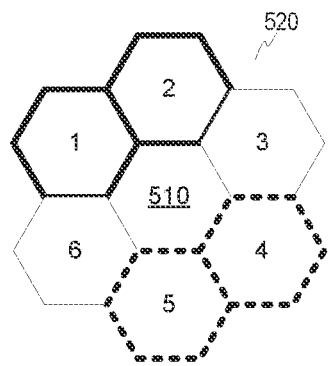
FIG. 5 depicts sub-pixel positioning according to some embodiments.
Figure 5:
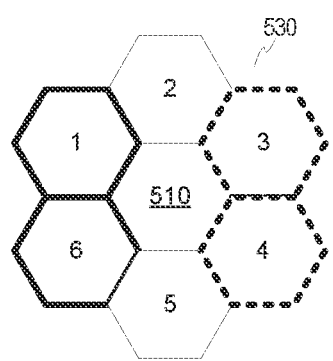
Figure 5:
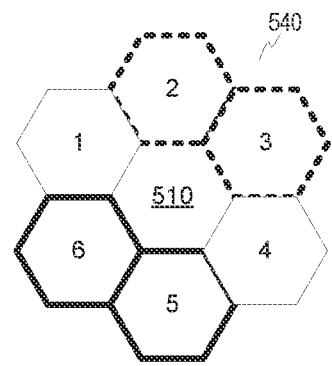
Figure 5:
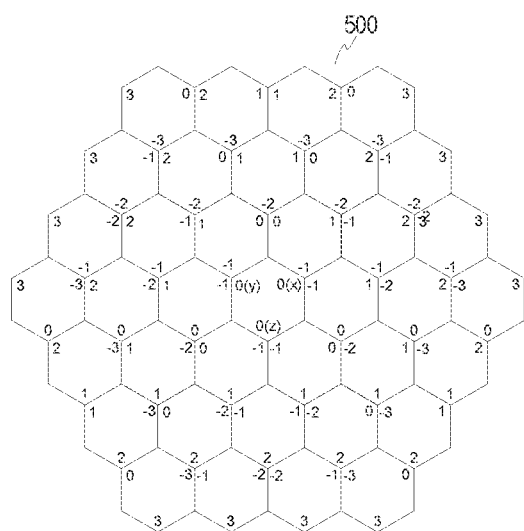

FIG. 5 illustrates determination of a sub-pixel at S420 according to some embodiments. Hexagonal-shape sensor 500 is depicted having 36 logical sub-pixels, but embodiments may define any number of sub-pixels per sensor. Due to the hexagonal shape of the sensor and the sub-pixels, the Anger ratios can be advantageously calculated in a hexagonal grid pattern having three directions, thereby improving the intrinsic resolution when using all coordinates. In particular, the three-dimensional sub-pixel location (x, y, z) within collecting sensor 510 of every gamma-ray event i can be determined based on signals induced on opposite groups of two electrodes, as shown with respect to $X_i$ illustration 520, $Y_i$ illustration 530, and $Z_i$ illustration 540, where $K_x$, $K_y$, $K_z$ and $K_{depth}$ are linear and "less" non-linear correction factors.

Figure 6:
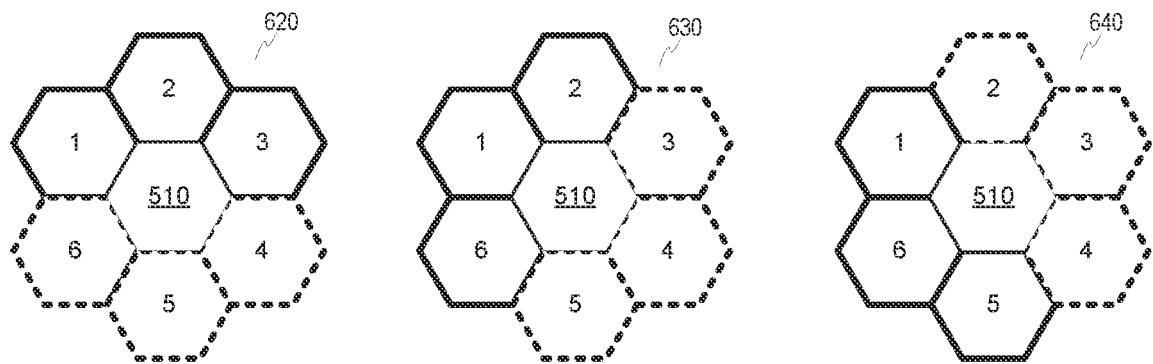
FIG. 6 depicts sub-pixel positioning according to some embodiments.
Figure 6:
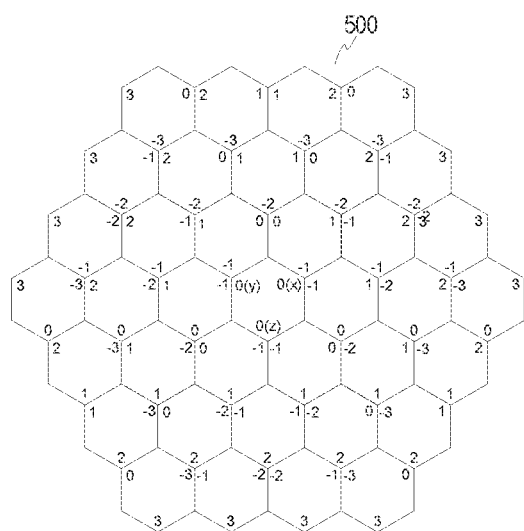

FIG. 6 also illustrates determination of a sub-pixel of collecting sensor 510 at S420 according to some embodiments. The determination of FIG. 6 uses an additional (i.e., third) signal to calculate each coordinate value, which increases the signal-to-noise ratio while shifting the axis of the sub-pixel position as shown in $X_i$ illustration 620, $Y_i$ illustration 630, and $Z_i$ illustration 640.

Determination of the sub-pixel position at S420 may utilize any suitable algorithm. Moreover, determination of the sub-pixel position may also or alternatively utilize signals from one or more sensors which are not immediately-adjacent to the collecting sensor.

Returning to process 400, an image is then generated at S430 based on the determined sub-pixel. It is assumed that S410 and S420 are executed many times in parallel in conjunction with many gamma ray interactions and resulting collected electrical charges, therefore the image generated at S430 includes image data of many sub-pixels. As described above, the generated image may comprise a two-dimensional image which may be used in conjunction with other two-dimensional images to reconstruct a three-dimensional volume as is known in the art.

Figure 7:
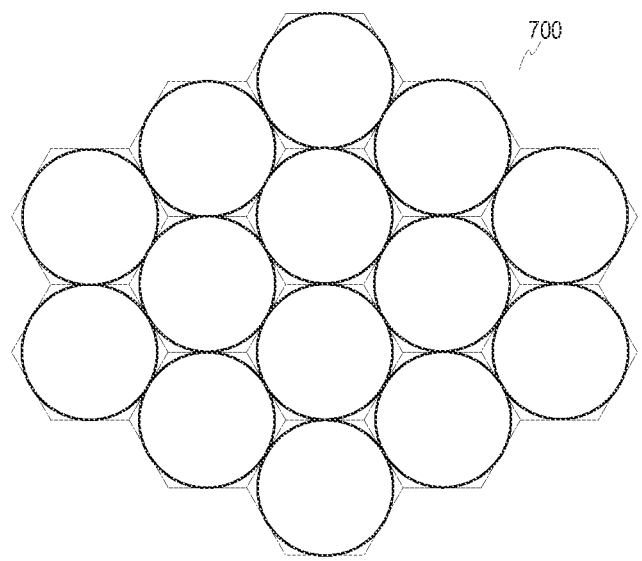
FIG. 7 is a view of a direct converter detector sensor array according to some embodiments.

FIG. 7 illustrates sensor array 700 according to some embodiments. The sensors of sensor array 700 are circular. In this regard, a circle exhibits the smallest perimeter for a given area of any shape. Accordingly, the circular-shaped sensors of array 700 exhibit the least capacitance of any sensor shape for a given area, resulting in the corresponding advantages described above.

Moreover, the sensors of array 700 are hexagonally-packed. Accordingly, for any given sensor of array 700, the centers of all neighboring sensors are equidistant from the center of the given sensor. This characteristic provides reduced non-linearity and increased consistency of positioning certainty for each sensor sub-pixel. Sensor array 700 may exhibit less sensitivity than array 100 due to the amount of non-charge-collecting area between the individual sensors of array 700.

Figure 8:
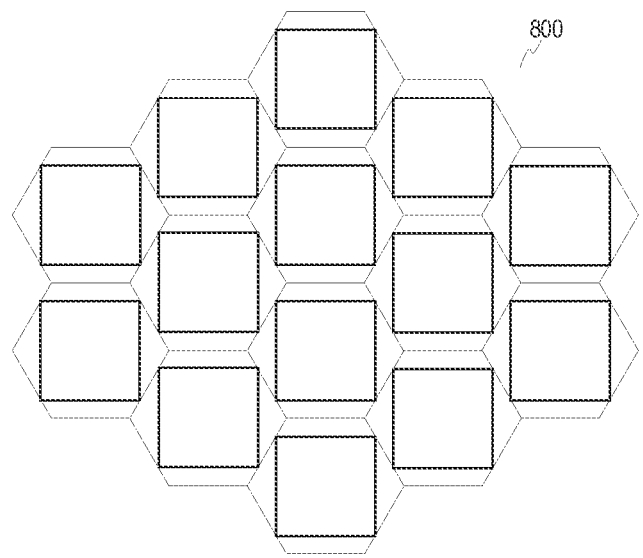
FIG. 8 is a view of a direct converter detector sensor array according to some embodiments.

FIG. 8 illustrates hexagonally-packed sensor array 800 according to some embodiments. The sensors of sensor array 800 are square-shaped and therefore exhibit greater capacitance per unit area than the hexagonal and circular sensors described above. Due to the hexagonal packing, for any given sensor of array 800, the centers of all neighboring sensors are equidistant from the center of the given sensor. Sensor array 800 may therefore provide reduced non-linearity and increased consistency of positioning certainty for each sensor sub-pixel, with respect to a traditional square lattice. Sensor array 800 may also exhibit less sensitivity than array 100 due to the amount of non-charge-collecting area between the individual sensors of array 800.

Figure 9:
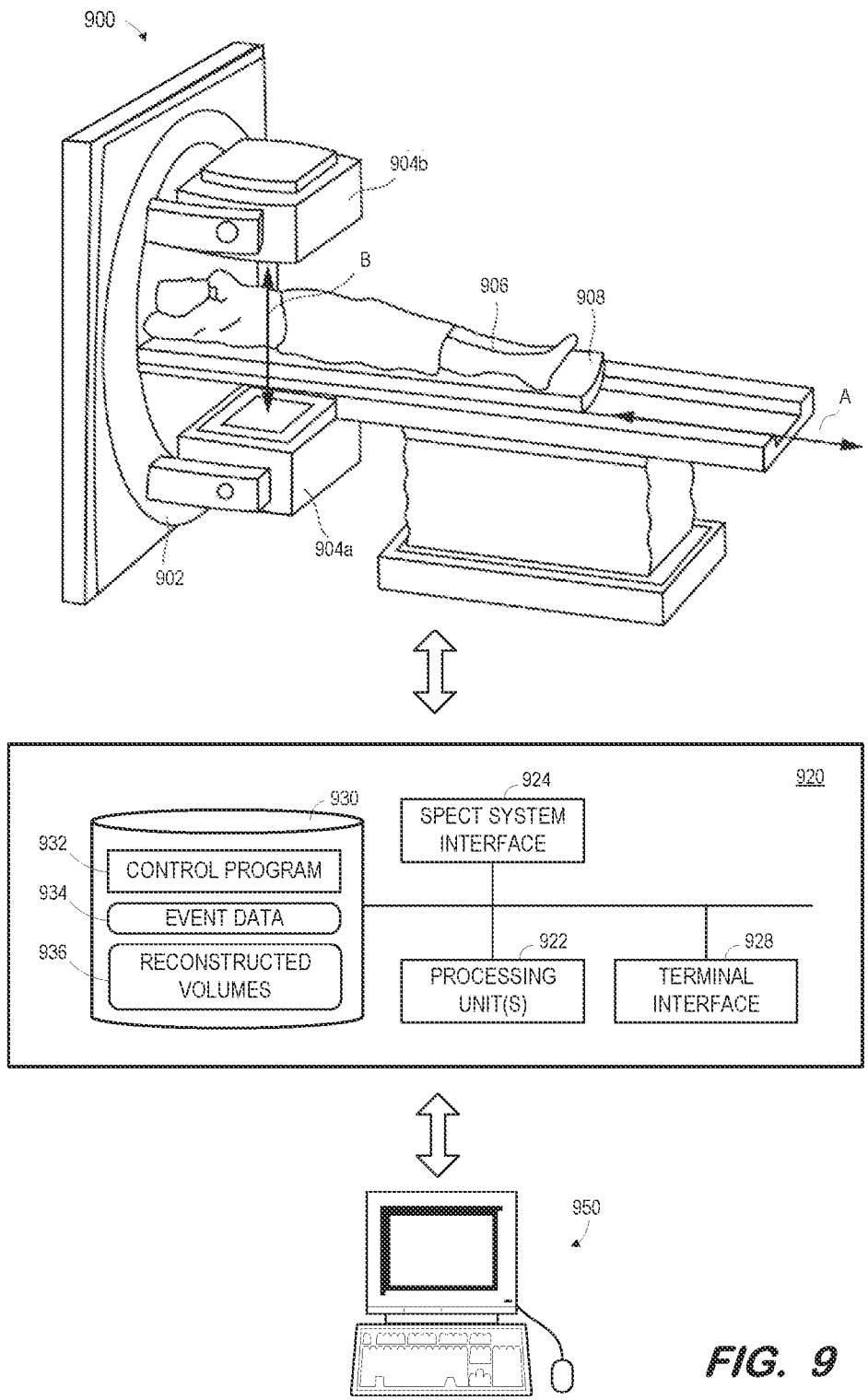
FIG. 9 illustrates components of a SPECT imaging system according to some embodiments.

FIG. 9 illustrates SPECT system 900 which may implement one or more direct converter detectors as described above. System 900 includes gantry 902 to which one or more detectors 904a, 904b may be attached. Each of detectors 904a, 904b detects gamma photons (i.e., emission data) emitted by a radioisotope within volume 906 on bed 908.

Bed 908 is capable of moving volume 906 along axis A and/or axis B. At respective bed positions (i.e., imaging positions), a portion of volume 906 is positioned between direct converter detectors 904a, 904b in order to capture emission data from that body portion. Direct converter detectors 904a, 904b may employ sensor arrays as described herein and may be coupled to multi-focal cone-beam collimators or parallel-hole collimators as is known in the art.

Control system 920 may comprise any general-purpose or dedicated computing system. Accordingly, control system 920 includes one or more processing units 922 configured to execute processor-executable program code to cause system 920 to operate as described herein, and storage device 930 for storing the program code. Storage device 930 may comprise one or more fixed disks, solid-state random access memory, and/or removable media (e.g., a thumb drive) mounted in a corresponding interface (e.g., a USB port).

Storage device 930 stores program code of system control program 932. One or more processing units 922 may execute system control program 932, in conjunction with SPECT system interface 940, to control motors, servos, and encoders to cause detectors 904a, 904b to rotate along gantry 902, to acquire signals from the sensors detectors 904a, 904b based on received gamma rays, and to determine sub-pixel positions of gamma ray events (i.e., projection images) based on the electrical signals as described herein. The event data 934 may be stored in memory 930. Control program 932 may also be executed to reconstruct volumes 936 from event data 934 as is known.

Terminal 950 may comprise a display device and an input device coupled to system 920. Terminal 950 may display any projection images or reconstructed volumes stored in memory 930. In some embodiments, terminal 950 is a separate computing device such as, but not limited to, a desktop computer, a laptop computer, a tablet computer, and a smartphone.

Each of component of system 900 may include other elements which are necessary for the operation thereof, as well as additional elements for providing functions other than those described herein.

Each functional component described herein may be implemented at least in part in computer hardware, in program code and/or in one or more computing systems executing such program code as is known in the art. Such a computing system may include one or more processing units which execute processor-executable program code stored in a memory system.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the claims. Therefore, it is to be understood that the claims may be practiced other than as specifically described herein.

What is claimed is:

1. A gamma ray detector comprising:
   a direct converter material;
   a cathode electrically coupled to the direct converter material; and
   an array of anodes electrically coupled to the direct converter material,
   wherein each anode of the array of anodes is disposed in a respective hexagonal-shaped area, each respective hexagonal area including only one anode.

2. A gamma ray detector according to claim 1, wherein each anode of the array of anodes is hexagonal-shaped.

3. A gamma ray detector according to claim 1, wherein each anode of the array of anodes is substantially circular.

4. A gamma ray detector according to claim 1, wherein each anode of the array of anodes is substantially square-shaped.

5. A gamma ray detector according to claim 1, further comprising a collimator,
   wherein openings defined by the collimator are not registered with the anodes of the array.

6. A method for constructing a gamma ray detector, comprising:
   coupling a cathode to a direct converter material; and
   coupling an array of anodes to the direct converter material,
   wherein each anode of the array of anodes is disposed in a respective hexagonal-shaped area, each respective hexagonal area including only one anode.

7. A method according to claim 6, wherein each anode of the array of anodes is hexagonal-shaped.

8. A method according to claim 6, wherein each anode of the array of anodes is substantially circular.

9. A method according to claim 6, wherein each anode of the array of anode is substantially square-shaped.

10. A method according to claim 6, further comprising:
    mounting a collimator to the detector,
    wherein openings defined by the mounted collimator are not registered with the anodes of the array.

11. A method comprising:
    collecting a first signal from a first sensor of an array of sensors electrically coupled to a material capable of converting a gamma ray to electrical charge, wherein the first sensor comprises a plurality of logical sub-pixels;
    collecting a signal from each sensor immediately-adjacent to the first sensor; and
    determining one of the plurality of sub-pixels by determining a value for each of three coordinate directions of a hexagonal grid based on the signals collected from each sensor immediately-adjacent to the first sensor.

12. A method according to claim 11, wherein each sensor of the array of sensors is hexagonal-shaped.

13. A method according to claim 11, wherein the sensors of the array of sensors are hexagonally-packed.

14. A method according to claim 13, wherein each sensor of the array of sensors is substantially circular.

15. A method according to claim 13, wherein each sensor of the array of sensors is substantially square-shaped.

16. A method according to claim 11, wherein each sensor of the array of sensor is disposed in a respective hexagonal-shaped area, each respective hexagonal area including only one sensor.

* * * * *